(12) United States Patent
Chang

(10) Patent No.: US 10,944,903 B2
(45) Date of Patent: Mar. 9, 2021

(54) METHOD FOR ACQUIRING IMAGE USING DIFFERENT FOCUS AT DIFFERENT DEPTH AND ELECTRONIC DEVICE USING THE SAME

(71) Applicant: Chiun Mai Communication Systems, Inc., New Taipei (TW)

(72) Inventor: En-Chieh Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/656,173

(22) Filed: Oct. 17, 2019

(65) Prior Publication Data

US 2020/0154041 A1  May 14, 2020

(30) Foreign Application Priority Data

Nov. 13, 2018 (CN) .......................... 201811349556.6

(51) Int. Cl.
*H04N 5/232* (2006.01)
*H04N 5/225* (2006.01)
*H04N 5/235* (2006.01)

(52) U.S. Cl.
CPC ....... *H04N 5/23232* (2013.01); *H04N 5/2256* (2013.01); *H04N 5/2351* (2013.01); *H04N 5/23219* (2013.01); *H04N 5/232125* (2018.08)

(58) Field of Classification Search
CPC ................................................ H04N 5/23232
See application file for complete search history.

(56) References Cited

U.S. PATENT DOCUMENTS

| | | | |
|---|---|---|---|
| 9,704,250 B1* | 7/2017 | Shah | H04N 5/2355 |
| 2016/0227100 A1* | 8/2016 | Liu | H04N 5/23212 |
| 2016/0295097 A1* | 10/2016 | Shanmugavadivelu | H04N 5/2258 |
| 2018/0139369 A1* | 5/2018 | Chen | H04N 5/232127 |

FOREIGN PATENT DOCUMENTS

| | | |
|---|---|---|
| CN | 107018323 | 8/2017 |
| CN | 107203743 A | 9/2017 |

* cited by examiner

*Primary Examiner* — Gary C Vieaux
(74) *Attorney, Agent, or Firm* — ScienBiziP, P.C.

(57) ABSTRACT

An electronic device able to adjust for large differences in skin tones and colors in images acquired includes a first camera module for acquiring a first image, a second camera module for acquiring a depth map, and a processor. The processor analyzes the first image and the depth map, and determines whether a face is detected only by the second camera module and not by the first camera module. If any such face is detected, the processor controls the first camera module to focus on the area of the face detected by the second camera module and acquire a second and further images after light-metering the semi-detected face.

14 Claims, 2 Drawing Sheets

METHOD FOR ACQUIRING IMAGE USING DIFFERENT FOCUS AT DIFFERENT DEPTH AND ELECTRONIC DEVICE USING THE SAME

FIELD

The subject matter herein generally relates to image acquiring.

BACKGROUND

A portable electronic device such as a mobile phone may include a camera module for acquiring images. When the camera module takes photos of a group of people in an environment with dim light, if the metering point is at the people having lighter skin tones, people having darker skin tones in the image may be unclear and become blended with the dim environment. If the metering point is at the people having darker skin tones, people having lighter skin tones in the image may be too bright. All of the above situations may result in poor image qualities.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
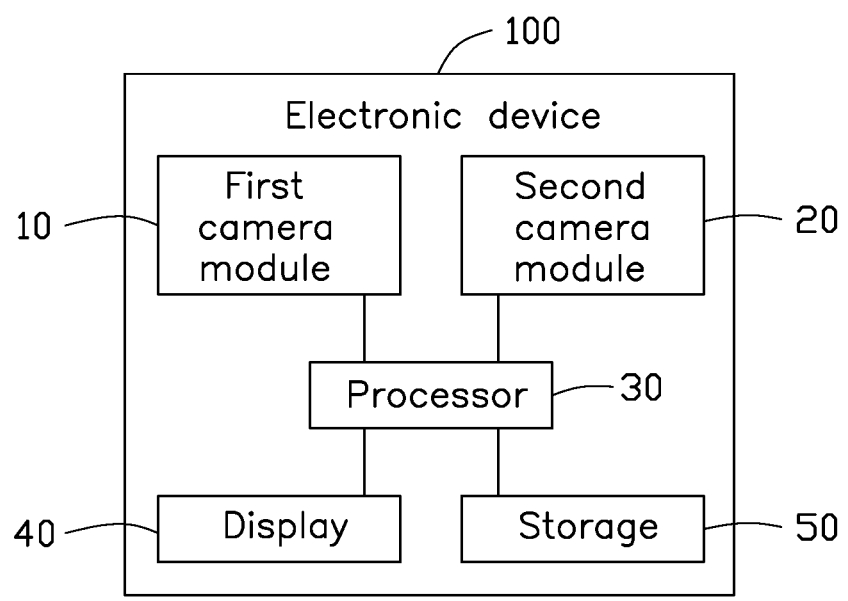
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates a block diagram of one embodiment of an electronic device. The electronic device 100 can be, but is not limited to, a security camera, a mobile phone, a computer, a server computer, a tablet computer, a personal digital assistant, a consumer portable electronic device, a distributed computing environment employing the aforesaid system, or other device. The electronic device 100 includes a first camera module 10, a second camera module 20, a processor 30, a display 40, and a storage 50. The first camera module 10, the second camera module 20, the display 40, and the storage 50 are electrically connected to the processor 30. Furthermore, the processor 30 is electrically connected to other electronic elements of the portable electronic device 100.

In this embodiment, the first camera module 10 is a normal camera configured for focusing on objects and detecting a face, and acquiring an image. When the first camera module 10 acquires the image of a person, the first camera module 10 can detect and focus on a face in the scene, and acquire an image with the detected face as a metering point.

In this embodiment, the second camera module 20 is a depth camera module 20 configured for acquiring a depth map. When the second camera module 20 views a scene, the second camera module 20 emits a light beam, such as a laser light or an infrared light. The light beam is reflected by an object. The second camera module 20 receives the reflected light beam. A distance between each point in the depth map corresponding to each scene will be different, and the time in which each light beam returns back is also different. Thus, the depth map can be obtained by calculating a depth (i.e. a distance between the object and the second camera module 20) by a time difference between a emission and reception of the light beam of each point in the depth map. The depth map acquired by the second camera module 20 is unaffected by ambient light. Thus, a face can be detected by the second camera module 20 even in dim lighting.

The display 40 provides a user interface, a acquired image of the first camera module 10, and the depth map of the second camera module 20. The display 20 can be a touch control display for detecting touch operations from the user. In addition, the display 20 may respond to touch operations by an object, such as a stylus, an indicator, a pen, a finger, a hand and/or a fingernail, etc. The display 40 can be operated by the user through the user interface to control the first camera module 10 and the second camera 20.

The processor 30 analyzes the images acquired by the first camera module 10 and the depth map acquired by the second camera module 20. The processor 30 analyzes the face in the image and depth map. The processor 30 can be a central processing unit, a single chip microcomputer, or other micro integrated circuit.

The storage 40 stores the images acquired by the first camera module 10 and the depth map acquired by the second camera module 20. The storage 40 can be a memory of the portable electronic device 100 or an external storage device, such as a Smart Media Card, a Secure Digital Card, or a Random-Access Memory (RAM), connected to the portable electronic device 100.

Figure 2:
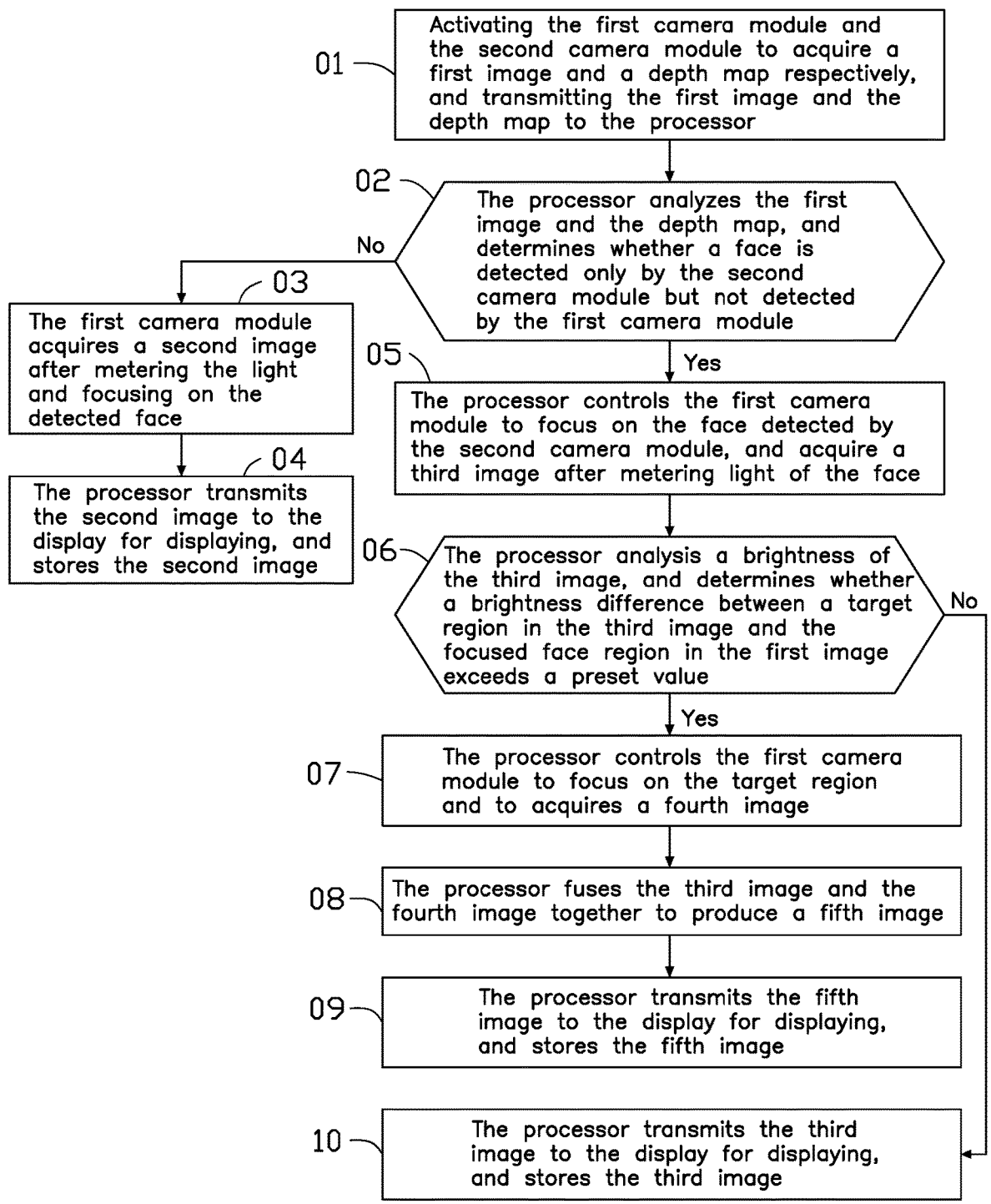
FIG. 2 is a flow chart of one embodiment of a method for acquiring an image in an electronic device.

In FIG. 2, a flowchart in accordance with an embodiment is disclosed. The image acquiring method of the electronic device 100 can be carried out using the configurations illustrated in FIG. 1, for example, and various elements of these figures are referenced in the method. Each block shown in FIG. 2 represents one or more processes, methods or subroutines, carried out in the method. Furthermore, the illustrated order of blocks is by example only and the order of the blocks can change. Additional blocks may be added or fewer blocks may be utilized, without departing from this disclosure. The method can begin at block 01.

At block 01, activating the first camera module 10 and the second camera module 20 to respectively acquire a first image and a depth map, the first image and the depth map being transmitted to the processor 30. In this embodiment, the first camera module 10 and the second camera module 20 acquire the first image and the depth map for a same shooting range in a same dim lighting. The shooting range can include one or more persons.

At block 02, the processor 30 analyzes the first image and the depth map, and determines whether a face is detected by the second camera module 20 but not detected by the first camera module 10. In this embodiment, when the first camera module 10 acquires the first image in the dim lighting, if the skin color of the person being acquired is dark, the face may not be detected by the first camera module 10. However, in the same dim lighting, the second camera module 20 is unaffected by the dim lighting and can detect all faces in the shooting range. If no face is detected by the second camera module 20 but not detected by the first camera module 10, the process goes to block 03. If a face is detected by the second camera module 20 but not detected by the first camera module 10, the process goes to block 05.

At block 03, the first camera module 10 acquires a second image after metering the light and focusing on the detected face.

At block 04, the processor 30 transmits the second image to the display 40 for display, and stores the second image to the storage 50.

At block 05, the processor 30 controls the first camera module 10 to focus on the face undetected by the first camera module 10 but detected by the second camera module 20. The first camera module 10 is controlled to acquire a third image after metering the light of the face. The processor 30 can control the first camera module 10 to focus on the face undetected by the first camera module 10 but detected by the second camera module 20 according to depth information in the depth map.

At block 06, the processor 30 analyzes a brightness of the third image, and determines whether a brightness difference between a target region in the third image and a focused face region in the first image exceeds a preset value. The target region can be any region in the third image, and a size and a sharp of target region can be preset, such as a rectangular having the size as 5 mm×2 mm. The focused face region can be a region in the first image including the face. If the processor 30 determines the brightness difference between the target region in the third image and the focused face region in the first image dose not exceed the preset value, and the process goes to block 10. If the processor 30 determines the brightness difference between the target region in the third image and the focused face region in the first image exceeds the preset value, and the process goes to block 07.

At block 07, the processor 30 controls the first camera module 10 to focus on the target region and to acquire a fourth image.

At block 08, the processor 30 fuses together the third image and the fourth image by a High-Dynamic Range (HDR) image technology to produce a fifth image. In this embodiment, the first camera module 10 synthesizes the fifth image by using portions of the third image and the fourth image having better details, which reflects better visual effects in the real-world environment.

At block 09, the processor 30 transmits the fifth image to the display 40 for displaying, and stores the fifth image to the storage 50.

At block 10, the processor 30 transmits the third image to the display 40 for displaying, and stores the third image to the storage 50.

The electronic device 100 determines whether any face is detected by the second camera module 20 but not detected by the first camera module 10 according to the image acquired by the first camera module 10 and the depth map acquired by the second camera module 20. The focus point and the metering point of the first camera module 10 are thus adjusted. The first camera module 10 can acquire images under different focus points and metering points. Better images can be obtained by fusing the images. People in the scene of different skin colors and brightness can appear with higher quality in the images, especially in environments with dim light.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device comprising:
a first camera module to acquire a first image;
a second camera module to acquire a depth map; and
a processor configured to analyze the first image and the depth map, and determine whether a face is detected by the second camera module but not detected by the first camera module;
wherein if a face is detected by the second camera module but not detected by the first camera module, the processor controls the first camera module to focus on the face detected by the second camera module; and controls the first camera module to acquire a second image after metering the light and focusing on the face detected by the second camera.

2. The electronic device of claim 1, wherein the processor determines whether a brightness difference between a target region in the second image and a focused face region in the first image exceeds a preset value, when the processor determines the brightness difference between the target region in the second image and the focused face region in the first image exceeds the preset value, the processor controls the first camera module to focus on the target region, and to acquire a third image.

3. The electronic device of claim 2, wherein the processor fuses the second image and the third image to produce a fourth image.

4. The electronic device of claim 3, wherein the processor fuses the second image and the third image with High-Dynamic Range (HDR) technology.

5. The electronic device of claim 3, further comprising a display, wherein the processor transmits the third image to the display for displaying, and stores the third image.

6. The electronic device of claim 2, further comprising a display, wherein when the processor determines the brightness difference between the target region in the second image and the focused face region in the first image does not exceed the preset value, the processor transmits the second image to the display for displaying, and stores the second image.

7. The electronic device of claim 1, further comprising a display, wherein if a face is detected by the second camera module but not detected by the first camera module, the first camera module acquires a fifth image after metering the light and focusing on a detected face of the first camera, the processor transmits the fifth image to the display for displaying, and stores the fifth image.

8. An image acquiring method applied in an electronic device, the electronic device comprising a first camera module and a second camera module, the image acquiring method comprising:

acquiring a first image and a depth map by the first camera module and the second camera module, respectively;

analyzing the first image and the depth map;

determining whether a face is detected by the second camera module but not detected by the first camera module;

controlling the first camera module to focus on the face detected by the second camera module and controlling the first camera module to acquire a second image after metering the light and focusing on the face detected by the second camera if a face is detected by the second camera module but not detected by the first camera module.

9. The image acquiring method of claim 8, further comprising:

determining whether a brightness difference between a target region in the second image and a focused face region in the first image exceeds a preset value;

controlling the first camera module to focus the target region when the processor determines the brightness difference between the target region in the second image and the focused face region in the first image exceeds the preset value; and acquiring a third image.

10. The image acquiring method of claim 8, further comprising:

fusing the second image and the third image to produce a fourth image.

11. The image acquiring method of claim 8, further comprising:

fusing the second image and the third image with High-Dynamic Range (HDR) technology.

12. The image acquiring method of claim 8, further comprising:

displaying and storing the third image.

13. The image acquiring method of claim 8, further comprising:

displaying and storing the second image when the processor determines the brightness difference between the target region in the second image and the focused face region in the first image does not exceed the preset value.

14. The image acquiring method of claim 8, further comprising:

acquiring a fifth image after metering the light and focusing on a detected face of the first camera if a face is detected by the second camera module but not detected by the first camera module; and displaying, and storing the fifth image.

* * * * *